(12) United States Patent
Romec

(10) Patent No.: US 11,498,688 B2
(45) Date of Patent: Nov. 15, 2022

(54) METHOD AND SYSTEM FOR ARMING/DISARMING AN AIRCRAFT DOOR SLIDE AND IMPLEMENTATION ASSEMBLY

(71) Applicant: LATECOERE, Toulouse Occitaine (FR)

(72) Inventor: Christian Romec, Cammas Occitaine (FR)

(73) Assignee: LATECOERE, Toulouse Occitaine (FR)

( * ) Notice: Subject to any disclaimer, the term of this patent is extended or adjusted under 35 U.S.C. 154(b) by 198 days.

(21) Appl. No.: 16/957,414

(22) PCT Filed: Dec. 23, 2018

(86) PCT No.: PCT/EP2018/086835
§ 371 (c)(1),
(2) Date: Jun. 24, 2020

(87) PCT Pub. No.: WO2019/129762
PCT Pub. Date: Jul. 4, 2019

(65) Prior Publication Data
US 2020/0346768 A1  Nov. 5, 2020

(30) Foreign Application Priority Data
Dec. 28, 2017  (FR) ...................................... 1763334

(51) Int. Cl.
*B64D 25/08*  (2006.01)
*B64C 1/14*  (2006.01)

(52) U.S. Cl.
CPC ............ *B64D 25/08* (2013.01); *B64C 1/1407* (2013.01)

(58) Field of Classification Search
CPC ... B64C 1/1423; B64C 1/1461; B64C 1/1407; B64D 25/14; B64D 25/08
See application file for complete search history.

(56) References Cited

U.S. PATENT DOCUMENTS 3,634,914 A * 1/1972 Schroedter ............. B64D 25/14
24/609
4,715,562 A * 12/1987 Bokalot ................ B64C 1/1407
244/905

(Continued)

FOREIGN PATENT DOCUMENTS

EP     0743246    11/1996
GB     505218     5/1939

(Continued)

*Primary Examiner* — Joshua J Michener
*Assistant Examiner* — Cindi M Curry
(74) *Attorney, Agent, or Firm* — Defillo & Associates, Inc; Evelyn A. Defillo

(57) ABSTRACT

An assembly for arming/disarming a slide of an airplane door according to the invention comprises a system with two releasable connection mechanisms (2) linked with the door (1) and a cabin floor of the airplane, each mechanism (2) comprising a releasable connector (21*b*) secured to the door (1), extending at right angles to the floor on each side of a door bottom, and an anchor fitting (22*b*) fixed to the cabin floor. Each connector (21*b*) is equipped with an elastic centering element (70) and a locking/unlocking grab (25*b*) on the corresponding anchor fitting (22*b*), the connectors (21*b*) being linked by a girt bar (5). Each grab (25*b*) being rotationally mobile, one of the grabs (25*b*) is driven by a single command (5; 25*b*) which drives the other grab in rotation via the girt bar (5).

17 Claims, 3 Drawing Sheets

(56) References Cited

U.S. PATENT DOCUMENTS

| | | | | |
|---|---|---|---|---|
| 2011/0139934 | A1* | 6/2011 | Giesa | B64D 25/14 |
| | | | | 244/137.2 |
| 2012/0146346 | A1* | 6/2012 | Hagemeyer | E05C 9/02 |
| | | | | 74/519 |
| 2016/0107755 | A1* | 4/2016 | Bessettes | B64C 1/1407 |
| | | | | 49/141 |

FOREIGN PATENT DOCUMENTS

| | | |
|---|---|---|
| WO | WO8400786 | 3/1984 |
| WO | WO2010073631 | 7/2010 |

\* cited by examiner

METHOD AND SYSTEM FOR ARMING/DISARMING AN AIRCRAFT DOOR SLIDE AND IMPLEMENTATION ASSEMBLY

CROSS REFERENCE TO RELATED APPLICATION

This application is a national stage entry of PCT/EP2018/086835 filed Dec. 23, 2018, under the International Convention claiming priority over French Patent Application No. FR1763334 filed Dec. 28, 2017.

TECHNICAL FIELD

The invention relates to a method for arming/disarming a line airplane door slide, on a passenger or service/evacuation door, linked with the airplane fuselage floor, and to an assembly for implementing such a method comprising an arming/disarming system.

Generally, in line airplanes, the doors are equipped with an inflatable slide for an emergency passenger exit, for example in the event of an unplanned landing. The floor of the passenger cabin of these airplanes is in fact too high to allow the passengers and the crew to jump from the aircraft onto the ground without being injured or suffering serious trauma.

The arming/disarming systems make it possible to couple or uncouple the slide to or from the fuselage floor, and to keep the slide attached to the fuselage during and after the deployment of the slide. In the event of an emergency door opening, the arming of the slide and its deployment take place overall in three steps:

arming of the slide on the door by securing of the slide rope on two separate fittings fixed to the floor of the cabin; the arming is triggered by a command situated on the door;

emergency opening of the door by actuation of the internal handle of the door which automatically triggers the opening thereof and releases the deflated slide; with the slide being moored to the floor by its rope, it is removed from its pack from the door and falls out of the cabin, the falling thereof actuating the inflation system; and inflation of the slide triggered by Venturi effect by virtue of the nitrogen or air pressure supplied by a tank provided for that purpose: the slide is deployed, its bottom part comes into contact with the ground outside of the airplane, and the passengers then use the slide to evacuate from the airplane without danger.

Conventionally, the rope of the slide is fixed around a metal girt bar, and the arming system anchors this bar into two fittings of the fuselage floor. The disarming of the slide consists in extracting the rope bar from its anchoring to the fuselage floor. An arming/disarming command, or "ARM/DISARM" for short, corresponds to two positions of a handle dedicated to this command. The handle positions visually indicate the status of the door. A light indicator can confirm this status at all times.

A command makes it possible to arm or disarm the slide and a visual indicator allows the operator to know the arming status of each slide at all times. Thus, the operator actuates the command before take-off to check that the change of status of the door is operating correctly, switching from the DISARM status—in which the slide is not releasable—to the ARM status which makes it possible to release the slide if necessary.

In the DISARM position, the slide is attached to form a tubular jacket around the girt bar and is stowed in a box fixed to the bottom of the door, in the fuselage or under the door threshold depending on the installations. The girt bar is held parallel to the floor of the cabin, conventionally by "U" clamps provided with releasable clips formed by spring blades or equivalent.

When the handle is brought into the ARM position of the door, the rotational movement of the handle is transformed into a vertical translational movement by a mechanical wiring to lock the handles secured to the bar onto fittings incorporated under the threshold of the floor via appropriate jaws. Conversely, the detachment of the bar is obtained by a jaw release mechanism actuated for example by a cable linked to an ancillary handle. A visual indicator, backed up by an audible indicator, alerts the operator that the slide of the door that he or she is trying to open is armed. This type of solution has been described in many publications and patent documents, such as, for example, U.S. Pat. Nos. 3,634,914, 4,715,562, EP 0743 246 or WO 1984000786.

STATE OF THE ART

Refinements have been proposed in order to take account of particular aspects in the hazardous context of emergency opening of a cabin door. For example, to prevent the untimely deployment of the slide, the patent document US 2011/0139934 provides sensors of human presence facing the cabin door, linked with a device warning of such a presence in proximity to the internal handle of the door.

There is also a patent US2016107755 concerning a slide fixing system without girt bar with electrical or mechanical implementation, which entails the use of a specific type of slide and the installation on the door of an autonomous electrical or mechanical management system. In addition, this solution, which provides an alternative to the use of a girt bar, results in an increase in weight and a complexity—and therefore a fragility—of the mechanism that are not inconsiderable.

This fixing system without girt bar therefore generates a bulk, an increase in weight and an increase in complexity of the mechanism. Generally, the known ARM/DISARM mechanisms remain fragile because they are subject to the presence of small objects or residues (gravel, earth, coins, dust, etc.) which can fall into the mechanism. The mechanism is then blocked by this waste and these environmental objects bound by the dirt built up at the bottom of the door, which causes slide deployment failure in emergencies.

When the arming status is not operational, exceptional and lengthy measures to restore the mechanism to working order are deployed. Furthermore, disarming difficulties can also occur in the presence of frost deposited on this mechanism.

SUMMARY OF THE INVENTION

The invention aims to overcome these drawbacks while implementing a standard slide and a simplified and less heavy mechanism. For this, it uses attachments mounted elastically on the door, linked by a girt bar and actuated by driving mechanisms. These attachments grab reversibly onto anchors fixed to the door threshold, the driving mechanisms remaining totally on the side of the door, and therefore well protected from environmental attacks.

To this end, the subject of the present invention is a method for arming/disarming a slide of an airplane door linked with an airplane cabin floor, this method consisting—in arming mode called ARM—in lowering the door to closed position to engage first connection parts of two releasable mechanisms on second connection parts of these releasable connection mechanisms with elastic centering element, respectively secured to the door and the cabin floor; in locking the first parts on the second parts of the mechanisms by a misalignment of respective impressions following a simultaneous rotational driving of the first connection parts by a translation according to a blocking kinematic triggered by a single command actuated by an energy source, other impressions of the first parts being then aligned releasably; in unfurling and inflating, in case of emergency exit, the slide attached only to this mechanism; and—in disarming mode called DISARM—in unlocking said mechanisms by a mechanical driving of reverse translational and rotational kinematic which unlocks the first parts from the second parts by an alignment of respective impressions and locks the first parts to the door by a misalignment of the other impressions, then in lifting the door to uncouple the parts of the mechanisms before preceding to open it.

The energy source is preferably mechanical, but it can alternatively be electrical with a motorized actuation. Moreover, the single command can be implemented by translation, which drives a simultaneous rotation at the level of each first connection part of the mechanisms, or by rotation at the level of just one of the first connection parts.

According to particular implementations:

the second connection parts secured to the cabin floor form leaders emerging from the floor;

the connection parts are aligned upon the lowering of the door by a fixing of the first connection parts secured to the door via the elastic centering element;

the blocking kinematic is composed of a simultaneous rotational driving at the level of each first connection part induced by a translational driving of the single command;

the rotational driving at the level of one of the first connection parts is performed by a translation actuated by the rotation at the level of the other first connection part serving as single command;

the rotational driving partially pivots each first connection part secured to the door between two angular positions, a locking position in the second part according to a blocking conformation, and a releasable position in which the first and second parts of each connection mechanism have complementary conformations;

the angular positions of the first parts of the connection mechanisms and of the command can be detected to confirm the arming/disarming state of the slide.

The invention relates also to an assembly comprising an airplane door slide arming/disarming system, an airplane door equipped with such a system and a corresponding airplane cabin floor for implementing the above method by two releasable connection mechanisms linked with the door and a cabin floor of the airplane. Each mechanism comprises a releasable connector secured to the door, extending at right angles to the floor on each side of a door bottom, and an anchor fitting fixed to the cabin floor. Each connector is equipped with an elastic centering element and a locking/unlocking grab on the corresponding anchor fitting, the connectors being linked by a girt bar. Each grab being rotationally mobile, one of the grabs can be driven by a single command which rotationally drives the other grab via the girt bar. The system also comprises an energy source for triggering the single command of each grab between two angular positions:

an angular locking position in which each grab and the corresponding anchor fitting have impressions in blocking conformation, and a releasable angular position in which each grab and the anchor fitting have impressions in complementary non-blocking conformation.

According to preferred embodiments:

each grab has two female impressions, a top impression being able to be coupled with a male impression of an end fitting of the connector linked to the door, and a bottom impression being able to be connected to a male impression of the corresponding anchor fitting;

the single command consists of the girt bar or one of the grabs mechanically coupled to a mechanical or electrical energy source;

each connector comprises a tube mounted at right angles to the cabin floor in a fixing support on the door, the tube is mounted in the support through an elastic centering element for absorbing misalignments between the parts, notably upon relative displacements in flight between the door and the fuselage or upon their connection during the lowering of the door into closed position;

the tube is mounted in the support through an elastic centering element capable of absorbing the misalignments between the connectors and the anchor fittings, notably upon relative displacements in flight between the door and the fuselage or upon their connection during the lowering of the door into closed position;

position sensors are mounted on a collar extending the tube in order to determine the angular position of the first connection parts and of the command to deduce therefrom the position of the grabs and the arming/disarming state of the slide;

each grab has a branch serving as attachment means for the girt bar;

a drawbar forms a target for each grab capable of being maneuvered to arm or disarm the slide in case of need, in particular in the event of failure of the electric motor serving as energy source;

each mechanism has a bistable system, in order to secure the two ARMED/DISARMED positions;

a light indicator informs the operator of the arming/disarming status of the door.

Also, a subject of the invention is an airplane door equipped with a slide arming/disarming system defined above.

DESCRIPTION OF THE FIGURES

Other data, features and advantages of the present invention will become apparent on reading the following nonlimiting description, with reference to the attached figures which represent, respectively.

DETAILED DESCRIPTION

Throughout the text, the terms "top" and "bottom" on the one hand, "vertical" and "horizontal" on the other hand, relate respectively to locations of elements or of parts of elements positioned according to standard relative locations, and to perpendicular or parallel spans at the landing or splashdown surface in the broad sense (ground or water) considered as a reference horizontal plane.

Figure 1:
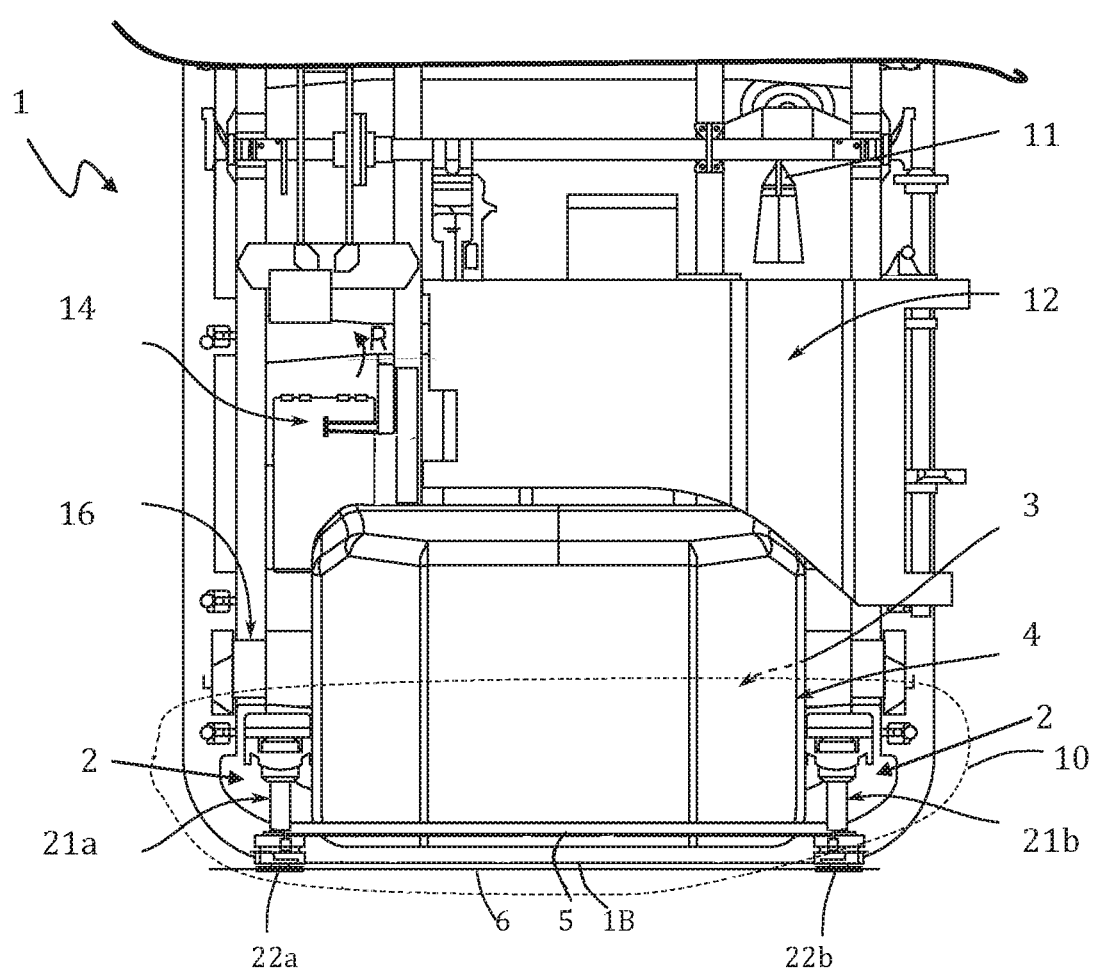
FIG. 1 shows a partial frontal view of an airplane door—from the interior of the airplane—equipped with an exemplary arming/disarming system according to the invention.

Referring to FIG. 1, a partial frontal view of the bottom part of an airplane door 1—from the interior of the airplane—equipped with an exemplary arming/disarming system 10 according to the invention is illustrated. This door 1 is the usual front entry/exit door for the passengers. It is equipped notably with a lifting/lowering handle 11, an arm 12 for opening the door 1 in order to allow passengers to access or exit and two releasable connection mechanisms 2.

Each releasable connection mechanism 2 makes it possible to use a slide 3 stored in the box 4 formed in the bottom part of the door 1 in cases of emergency which require the evacuation of the occupants of the airplane. The operation of these mechanisms 2 is triggered by the rotation (arrow R) of a command handle 14. Light diodes (not illustrated) or backlit knobs can advantageously be disposed on the door 1 visually signal the respectively armed or disarmed state of the arming system 10.

The arming kinematic consists in a combined rotational driving of the mechanisms 2 via a girt bar 5, this driving being induced conventionally from a translational driving controlled by the handle 14 via pinions and/or rotational/translational linkage connecting rods, the duly translated girt bar 5 guaranteeing the angular synchronization of the mechanisms 2.

The system 10 is equipped with two mechanisms 2 which comprise a releasable connector 21a and 21b extending at right angles to the floor 6, on each side of a door bottom 1B. These connectors 21a, 21b are coupled to the girt bar 5 and fixed to a reinforcing structure 16 of the door 1. Each mechanism 2 also comprises an anchor fitting 22a, 22b releasably linked with the connector 21a, 21b. These anchor fittings 22a and 22b are fixed to the cabin floor 6. In FIG. 1, the door 1 is lowered to the closed position and the connectors 21a and 21b are engaged on the fittings 22a and 22b. In the figures in which a single connector 21a or a single fitting 22a is represented, the description is valid for the other connector 21b or the other fitting 22b.

Figure 2:
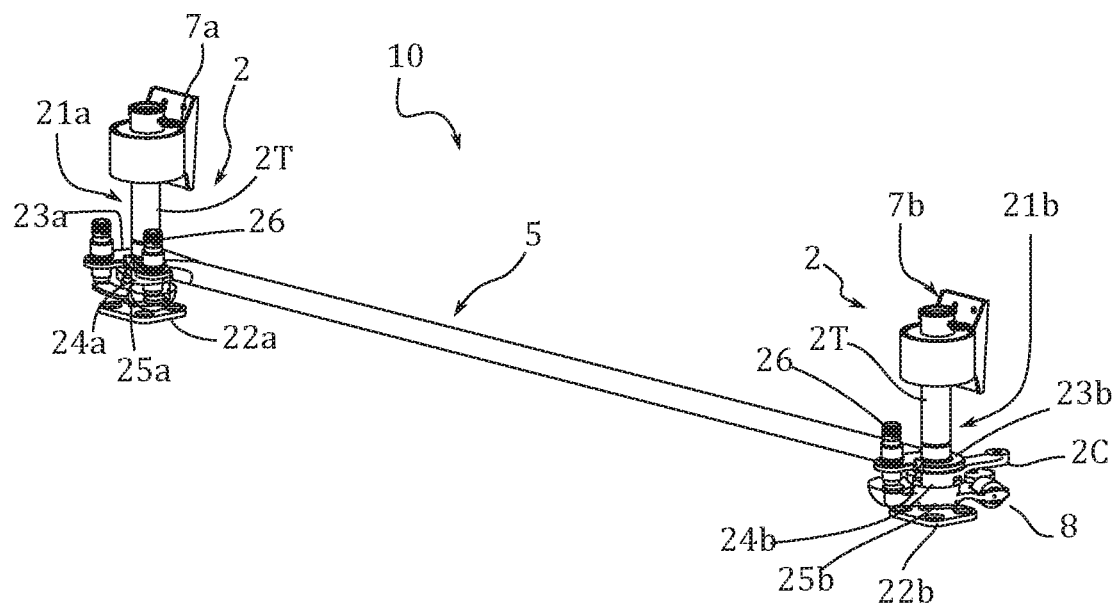
FIG. 2 shows a perspective view of an exemplary arming/disarming system according to FIG. 1.

FIG. 2 illustrates a perspective view of an exemplary arming/disarming system 10 according to FIG. 1. This system 10 comprises the two releasable connection mechanisms 2 at the ends of the girt bar 5. Each mechanism 2 comprises the connector 21a, 21b, secured to the door 1 (cf. FIG. 1) via a fixing support 7a, 7b, and releasably linked with the corresponding anchor fitting 22a, 22b, as illustrated in more detail hereinbelow.

The slide girt bar 5 is coupled to each grab 25a, 25b via a branch, a hook or other seizing means. Advantageously, this bar 5 can be lengthwise adjustable. Alternatively, the anchor fittings 22a, 22b can be adjustable in position in order to render the bar 5 non-adjustable.

Seen from the outside, each connector 21a, 21b consists of a tube 2T linking to the door 1 (cf. FIG. 1), extended in succession toward the anchor fitting 22a, 22b by a collar 23a, 23b, a drive ring 24a, 24b provided with a drawbar 2C, and a grab 25a, 25b.

Each collar 23a, 23b is equipped with sensors 26 which extend between the collars 23a, 23b and the grabs 25a, 25b to indicate the ARM or DISARM state of the slide from the angular positions of the grab 25a, 25b or of the drawbar 2C. One of the grabs 25a, 25b, or both alternatively, preferably has a bistable system 8, for example of solenoid type, in order to secure the positions corresponding to the ARM and DISARM states. The drawbar 2C serves as target for the sensors 26.

Figure 3:
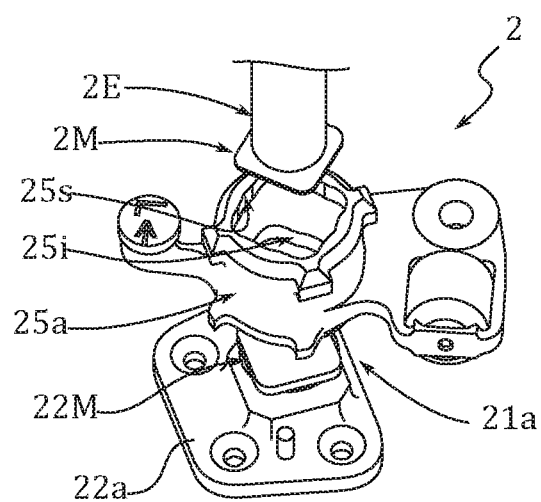
FIG. 3 shows an exploded view of the connection between a tube linking to the door and the anchor fitting of the door floor.

Referring to the exploded view of FIG. 3, the articulation of one of the releasable connection mechanisms 2 between a tubular end fitting 2E internal to the link tube 2T (cf. FIG. 2) of the connector 21a, the grab 25a and the door floor anchor fitting 22a appears in detail, in ARM angular position in this figure. The tubular end fitting 2E has a male square impression 2M which comes to be housed in the top female square impression 25s of the grab 25a, while the male square impression 22M of the anchor fitting 22a blocks the bottom female square impression 25i of the grab 25a.

Figures 4A, 4B:
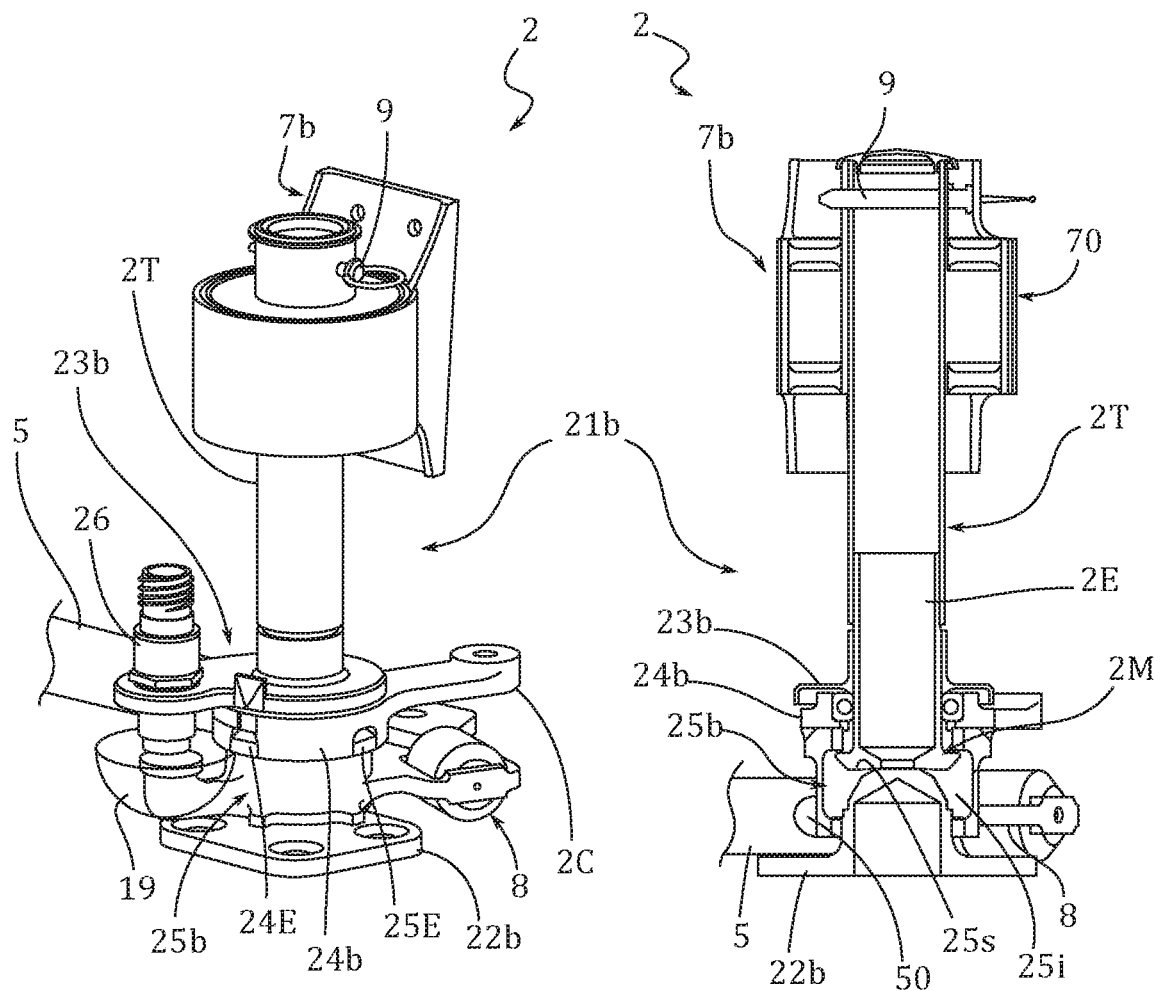
FIG. 4A shows a perspective view of the releasable connection mechanism on an anchor fitting of the door floor.
FIG. 4B shows a cross-sectional view of the releasable connection mechanism on an anchor fitting of the door floor.

FIGS. 4A and 4B illustrate, respectively in perspective view and in cross section, one of the releasable connection mechanisms 2 on an anchor fitting 22b of the door floor 6 (cf. FIG. 1). In these FIGS. 4A and 4B, as described previously with reference to FIG. 2, the connector 21b is mounted on the fixing support 7b and releasably linked with the anchor fitting 22b. The connector 21b consists of the tube 2T linking to the door 1 (cf. FIG. 1) extended in succession by the collar 23b, the drive ring 24b provided with the drawbar 2C, and the grab 25b. The grab 25b and the drive ring 24b are coupled in the example illustrated by lugs 25E and notches 24E.

The collar 23b is equipped with the sensor 26 which performs a dual measurement at the collar 23b and the grab 25b, to indicate the ARM or DISARM state of the slide from the angular position of the grab 25b and/or of the drawbar 2C. The grab 25b has the bistable system 8 for securing the positions corresponding to the ARM and DISARM states.

The tube 2T is mounted in the support 7b through a centering element 70 made of elastic material in order to compensate for the alignment defects between the support 7b and the anchor fitting 22b, notably upon relative displacements in flight between the door and the fuselage or upon their connection during the lowering of the door into closed position. The centering elements 70 can be attached to the "slide pack" or to the door. Thus, the system is self-centering and makes it possible to eliminate the adjustment of the anchoring on the fuselage. The flexibility of the centering elements 70 makes it possible not to use precise tolerancing on the system as a whole.

Furthermore, the tube 2T is held at the end above the support 7b by a pin 9 which passes right through it. In the event of transfer of the slide, the pin 9 is removed, thus releasing the tube 2T in translation. The tube is returned into its support 7b, the grab 25b remaining secured to the anchor fitting 22b. The grabs 25b (25a) can be rotationally actuated manually to unlock them from the anchor fittings 22b (22a). The assembly of grabs 25a, 25b, bar 5 and slide 3 is then removed and moved to another door.

As appears in the cross-sectional view of FIG. 4B, the tube 2T is extended by the end fitting 2E whose male square impression 2M is housed in the top female square impression 25s of the grab 25b. Likewise, the anchor fitting 22b comes to be fitted into the bottom female impression 25i of the grab 25b. Moreover, the girt bar 5 is mounted on the grab 25b so as to be adjustable by virtue of openings 50 in a branch (masked in the figure) of the grab 25b.

The blocking kinematic of the slide 3 by the system 10 (cf. FIG. 1) proceeds overall (cf. FIGS. 2, 3 and 4B) by rotational driving at the level of the grab 25b from the command which induces the rotation of the other grab 25a by a translational driving via the girt bar 5. The kinematic is thus implemented by a single command driven mechanically in this example by the rotation of the handle 14 (cf. FIG. 1). In case of need, the drawbar 2C can be maneuvered to arm or disarm the slide.

The rotational driving of the grab 25*a* is done by translation of the girt bar 5 actuated by the rotation of the grab 25*b*. The rotational driving pivots the grabs 25*a*, 25*b* between two angular positions, a locking position in which each grab 25*a*, 25*b* is arranged in the recesses of impressions of the other parts, end fittings 2E and anchor fittings 22*a*, 22*b* according to a blocking conformation, and a releasable position in which each grab 25*a*, 25*b* and the recesses, of the square impressions in the example, have complementary conformations. The locking of each grab 25*a*, 25*b* in the ARM or DISARM position is therefore performed by the rotation of a command piece. These rotations align or misalign the impressions 22M, 25*i*, 25*s* and 2M respectively of the anchor fittings 22*a*, of the grabs 25*a*, 25*b* and end fittings 2E corresponding to the locking (ARM) and unlocking (DISARM) positions of the slide 3.

More specifically, the door 1, in closing, has a lowering movement. This movement allows the grabs 25*a*, 25*b* to be engaged and centered on the anchor fittings 22*a*, 22*b*. The arming command actuates the rotation of one of the grabs 25*a*, 25*b*. The impressions 25*s* and 2M respectively of the grabs 25*a*, 25*b* and of the end fittings 2E are then aligned. The grabs 25*a*, 25*b* are then locked on the anchor fittings 22*a*, 22*b* and the impressions 2M are unlocked from the grabs 25*a*, 25*b*.

In the event of emergency opening (opening in ARM position), the raising of the door 1 separates the end fitting impressions 2M and respective grabs 25*a*, 25*b* which, locked on the anchor fitting 22*a*, 22*b*, remain in place. The girt bar 5 of the slide 3 is thus retained by the anchors, thus actuating the slide deployment sequence.

The disarming command actuates the reverse rotation of the command. The impressions 25*i* and 22M respectively of the grabs 25*a*, 25*b* and of the anchor fittings 22*a*, 22*b* are then aligned. The grab 25*a*, 25*b* is then unlocked from the anchor fitting 22*a*, 22*b*. The impressions 25*s*, 2M of the grab 25*a*, 25*b* and of the end fitting 2E are then misaligned. The end fitting 2E is then locked on the corresponding grab 25*a*, 25*b*. In the event of normal opening (opening in DISARM position), the raising of the door lifts the assembly of end fitting 2E and corresponding grab 25*a*, 25*b*. The girt bar 5 of the slide 3 remains on the door 1, the slide 3 is therefore not deployed upon the opening of the door 1.

The assembly described above simplifies the operation through a reduction of the number of moving parts and a simplification of the geometry of its constituent parts. The overall weight is thus reduced. The simplification of the assembly has also allowed for its bulk to be reduced and therefore for a bigger slide to be installed, in line with the regulatory trend. The assembly presented allows for the use of a standard slide.

Compared to the traditional versions with girt bar, the joining connecting rod between front and rear attachments is eliminated. Furthermore, the assembly presented is advantageously protected from the flow of water by a covering cup 19 (cf. FIG. 4*a*), which greatly reduces the impact of "icing" (ice being propagated inside the door). Furthermore, the anchoring is significantly less sensitive to the various waste accumulations. The form of the anchoring is not aggressive for the passengers, in normal or emergency cases. The system is self-centering and allows for the elimination of the adjustment of the anchoring on the fuselage.

The invention is not limited to the exemplary embodiments described and represented. Depending on the specific need, the command can be mechanical or electrical. The number of sensors and the number of indicators can be reduced. A second bistable system can be added at the other end of the girt bar.

The form of the impressions (square in the example) can be adapted to reduce the necessary rotation angle for the disengagement of the impressions (pentagonal, hexagonal, heptagonal, octagonal, etc.).

The invention claimed is:

1. A method for arming/disarming a slide of an airplane door linked with a cabin floor of the airplane, the method comprising the steps of:
   activating an arming mode for lowering the airplane door into closed position to engage a first releaseable connector of two releaseable mechanisms with a centering element on a second releaseable connector of the two releaseable mechanisms, respectively secured to the door and to the cabin floor;
   coupling the first releasable connector to a first end of a girt bar and the second releasable connector of a second end of the girt bar;
   locking the first releasable connector on the second releasable connector by a misalignment of a bottom female square impression and a male square impressions following a simultaneous rotational driving of the first releasable connector to a blocking position triggered by a moment of a command handle for attaching locking/unlocking devices of the first releasable connector to the girt bar, wherein a top female square impression and the male square impression of the first releasable connector are aligned releasably; wherein in case of an emergency, the slide attached only to each one of the two releasable mechanisms is unfurled and inflated; and
   wherein in a disarming mode, the two releasable mechanisms are unlocked by a reverse movement and rotational movement which unlocks the first releasable connector from the second releasable connector by an alignment of the bottom square female impression and the male square impression and locks the first releasable connector to the door by a misalignment of the other male square impression and the top female square impression, then lifting the door to uncouple the first and second releasable connector of the two releasable mechanisms before preceding to open the door.

2. The arming/disarming method as claimed in claim 1, wherein the second releasable connector is secured to the cabin floor by using anchor fittings.

3. The arming/disarming method as claimed in claim 1, wherein the first and the second releasable connectors are aligned upon the lowering of the door by a fixing of the first releasable connector secured to the door via the centering element, the centering element is made of an elastic material.

4. The arming/disarming method as claimed in claim 1, wherein the blocking position is made up by a simultaneous rotational driving at the level of each first releasable connector induced by a movement of the command handle.

5. The arming/disarming method as claimed in claim 1, wherein the rotational driving at the level of one of the first releasable connectors performed by a movement actuated by the rotation at the level of the other first connection part serving as a command handle.

6. The arming/disarming method as claimed in claim 1, wherein the rotational driving partially pivots each first connection part secured to the door between two angular positions, a locking position in the second part according to a blocking position, and a releasable position in which the first and second releasable connectors of each connection of the two releasable mechanisms have a non-blocking position.

7. The arming/disarming method as claimed in claim 1, the angular positions of the first releasable connector of connection, the two releasable mechanisms and of the single command handle and are detected to confirm the arming/disarming state of the slide.

8. An assembly comprising a system for arming/disarming a slide of an airplane door, an airplane door equipped with such a system and a corresponding airplane cabin floor comprising:
   a first and a second releasable mechanisms linked with the door and a cabin floor of the airplane in which each one of the first releasable mechanisms comprises a first releasable connector secured to the door, the second releasable mechanism includes a second releasable connector, the first and the second releasable connectors extend at right angles to the floor on each side of a door bottom, and an anchor fitting fixed to the cabin floor, in which each one of the releasable connectors is equipped with a centering element and a locking/unlocking grab on the corresponding anchor fitting,
   a girt bar having on a first end connected to the first releasable connector and a second end connected to the second releasable connector, each one of the locking/unlocking grabs includes a device to attach to the girt bar, and in which each locking/unlocking grab is rotationally mobile, one of the locking/unlocking grabs driven by a command handle which rotationally drives the other locking/unlocking grab via the girt bar between two angular positions:
   an angular locking position in which each locking/unlocking grab and the corresponding anchor fittings have a bottom female square impression and a male square impression in blocking position, and
   a releasable angular position in which each locking/unlocking grab and the anchor fitting have the bottom female square impression and the male square impression in non-blocking position.

9. The assembly as claimed in claim 8, wherein each one of the locking/unlocking grabs has two female square impressions, a top female square impression to be coupled with a male impression of an end fitting of each one of the releasable connectors linked to the door, and a bottom impression being able to be connected to a male impression of the corresponding anchor fitting.

10. The assembly as claimed in claim 8, wherein the command handle includes the girt bar.

11. The assembly as claimed in claim 8, wherein each connector comprises a tube mounted at right angles to the cabin floor in a fixing support on the door, the tube being mounted in the support through the centering element for absorbing misalignments between each one of the releaseable connectors and the anchor fittings.

12. The assembly as claimed in claim 11, wherein the tube is mounted in the support through the centering element capable of absorbing the misalignments between each one of the releasable connectors and the anchor fittings.

13. The assembly as claimed in claim 12, wherein position sensors are mounted on a collar extending the tube in order to determine the angular position of each one of the releasable connectors and of the command handle to deduce therefrom the position of the locking/unlocking grabs and the arming/disarming state of the slide.

14. The assembly as claimed in claim 8, wherein each of the locking/unlocking grabs are secured to the girt bar.

15. The assembly as claimed in claim 8, wherein a drawbar forms a target for each one of the locking/unlocking grabs being maneuvered to arm or disarm the slide in case of need.

16. The assembly as claimed in claim 9, wherein each one of the two releaseable mechanisms has a bistable system to secure the two ARMED/DISARMED positions.

17. An airplane door equipped with a system for arming/disarming a slide comprising two releaseable mechanisms, each one of the two releaseable mechanisms comprising a releasable connector secured to the door, extending on each side of a door bottom, and an anchor fitting intended to be fixed to a cabin floor, in which each one of the releaseable connectors is equipped with a centering element and a locking/unlocking grab on the corresponding anchor fitting, each one of the releaseable connectors being linked by a girt bar from each grab, and in which, each one of the locking/unlocking grabs being rotationally mobile, one of the locking/unlocking grabs can be driven by a command handle which rotationally drives the other locking/unlocking grab via the girt bar; the system also comprising the command handle moves each of the locking/unlocking grabs between two angular positions:
   an angular locking position in which each one of the locking/unlocking grabs and the corresponding anchor fittings have impressions in blocking position, and
   a releasable angular position in which each one of the locking/unlocking grabs and the anchor fittings have impressions in non-blocking position.

* * * * *